US006238520B1

(12) United States Patent
Greenwood

(10) Patent No.: US 6,238,520 B1
(45) Date of Patent: May 29, 2001

(54) MANUFACTURE OF PAPER

(75) Inventor: Graham Greenwood, Blackburn (GB)

(73) Assignee: Ciba Specialty Chemicals Water Treatments Limited, Bradford (GB)

( * ) Notice: Subject to any disclaimer, the term of this patent is extended or adjusted under 35 U.S.C. 154(b) by 0 days.

(21) Appl. No.: 09/297,876

(22) PCT Filed: Mar. 11, 1997

(86) PCT No.: PCT/GB97/00675

§ 371 Date: May 10, 1999

§ 102(e) Date: May 10, 1999

(87) PCT Pub. No.: WO98/22653

PCT Pub. Date: May 28, 1998

(30) Foreign Application Priority Data

Nov. 19, 1996 (GB) .................................................. 9624031

(51) Int. Cl.⁷ .......................... D21H 17/28; D21H 21/10
(52) U.S. Cl. ..................................... 162/164.1; 162/168.1; 162/168.2; 162/168.3; 162/175; 162/181.1; 162/181.6; 162/181.8; 162/183
(58) Field of Search ................................. 162/175, 181.6, 162/181.8, 183, 168.1, 168.3, 168.2, 164.1, 164.3, 164.6, 181.1

(56) References Cited

U.S. PATENT DOCUMENTS

| 3,873,336 | 3/1975 | Lambert et al. ...................... 106/306 |
| 4,385,961 | 5/1983 | Svending et al. .................... 162/175 |
| 4,799,964 | 1/1989 | Harvey et al. ....................... 106/436 |
| 5,584,966 | * 12/1996 | Moffett ................................. 162/175 |

FOREIGN PATENT DOCUMENTS

| 361763 | 4/1990 | (EP) . |
| 95/33096 | 12/1995 | (WO) . |

* cited by examiner

*Primary Examiner*—Peter Chin
(74) *Attorney, Agent, or Firm*—David R. Crichton

(57) ABSTRACT

Starch is added to the thinstock in a papermaking process in the form of a coagulated slurry containing undissolved starch particles, cationic polymeric flocculant and anionic microparticulate network agglomeration aid, such as bentonite. The flocculant and agglomeration aid interact to give network flocculation in which the starch particles are trapped. Improved retention of the starch in the resulting paper is achieved.

18 Claims, No Drawings

MANUFACTURE OF PAPER

This invention relates to the production of paper which is strengthened by starch.

It is well known to make paper on a paper-making machine by providing a cellulosic thinstock suspension, flocculating the suspension by adding a solution of polymeric retention aid and thereby forming a flocculated suspension, draining the flocculated suspension through a moving screen to form a wet sheet, and carrying the sheet through a heated drying zone and thereby forming a dry sheet. The retention aid can be dissolved cationic starch but is often a synthetic polymeric material. It is preferably of high or very high molecular weight, generally having intrinsic viscosity above 4 dl/g.

An alternative to this process involves additionally shearing the flocculated suspension so as to degrade the flocs and then adding an aqueous suspension of microparticulate anionic material, thereby reflocculating the suspension, and then draining the reflocculated suspension through the screen.

It is often desired to add starch during the process, often to the cellulosic thinstock, to improve the strength of the paper produced. This can for instance be desirable in fluting medium and liner board, which are usually substantially unfilled. Increasing their strength makes them more suitable for use as packaging materials. It is also often desired to include starch in filled sheets as the inclusion of significant amounts of filler would otherwise tend to reduce the strength of the sheet.

In order to maximise strength, it is desirable to include starch in amounts which can be as much as 5 or 10% or even higher.

Soluble cationic starch is reasonably substantive to the cellulosic fibres in amounts up to about 1 to 1.5% by weight of starch, based on dry weight of paper, and it is known to include this in the cellulosic suspension. If the amount of dissolved cationic starch in the suspension is increased significantly above this, there may be little or no increase in the amount of starch which is retained in the paper. Instead, there is merely an increase in the amount of dissolved cationic starch which is in the white water which drains through the screen. This is undesirable since it will build up to high concentrations when the whitewater is recycled and it must be removed before discharge as effluent, otherwise it can create a high chemical oxygen demand in the effluent from the mill.

It is also known to attempt to include insoluble starch in the paper. When it is desired to include a greater amount of starch than 1 to 1.5%, the usual technique involves applying an unmodified starch solution on a size press at the end of the paper making machine, i.e. after partial or complete drying of the sheet. The application of a solution of starch at this point can result in higher pick-up (for instance up to 7 or 10%). However it can result in the starch being concentrated more on the surface than in the centre of the sheet and it has the particular disadvantage that it necessitates redrying of the sheet, thus wasting heat energy and/or slowing down the process.

Another known method for providing significant loadings of starch in the paper involves applying a spray or a foam containing undissolved starch particles onto the wet sheet before it is carried through the dryers, followed by cooking the starch during drying. This process also has the disadvantage of tending to produce a higher concentration of starch on the surface than in the centre of the sheet. Its particular disadvantage is that it is very difficult to achieve uniform application of the starch by spraying or foam application for prolonged periods because of the tendency of the starch composition to cause blockages in the spray or foam applicators.

Attempts have been described to include cold water insoluble particulate starch in the suspension before drainage. Fowler describes some of these in Paper 23, January 1978 (vol. 189 No. 2 1978), pages 74 and 93. One particular method he suggests is inclusion of raw uncooked starch in a slurry with bentonite. This is then added to the stock prior to retention aid addition. We were involved with the work on his suggested system, and in practice addition of the slurry was made to the thickstock. Fowler suggests that the bentonite absorbs the starch and, after addition to the stock and inclusion in the stock of the retention aid, the bentonite is flocculated by the retention aid. Fowler also suggests that retention can be increased by including in the slurry of starch and bentonite a highly charged polymer of opposite charge to that of the retention aid. He suggests that the flocculation of the bentonite which occurs on addition to the stock of the retention aid is then greater. In practice, the polymers used were low molecular weight, highly charged anionic polymers, and this is why flocculation occurred only on addition of retention aid to the stock.

We have recently investigated these systems further. Results are set out below in this specification. We have confirmed that the slurry of starch and bentonite does, of course, remain unflocculated in the presence of the highly charged low molecular weight anionic polymer and that retention of starch in the system is not good.

It has also been suggested in GB 2,223,038 that reduction in strength due to the late addition of filler to the cellulosic suspension can be reduced by adding the filler as a slurry of filler, insoluble starch particles and flocculating agent. A suspending agent such as a gum, a synthetic organic polymer or a swelling clay, e.g. bentonite, can also be included in the slurry, preferably so as to reduce the net charge in the composition close to zero. Preferred systems use a non-ionic flocculating agent and non-ionic suspending agent.

Such compositions include large amounts of filler, preferably 30 to 40%. Amounts of starch and flocculant, based on filler, are preferably 1 to 5% and 0.05 to 0.2% respectively. The amount of starch in the final paper is said typically to be 0.05 to 1.5%.

This system is aimed at the problem of including a large amount of filler in a paper. It appears that the starch is included in the slurry solely to improve strength and as a binder for the filler. The system has the particular disadvantage that it necessitates the addition of large amounts of filler immediately before the headbox, which can tend to weaken the paper.

It would be desirable to be able to provide a method of making paper having increased levels of starch whilst maintaining good starch retention during the process so as to avoid as far as possible problems of starch in the effluent. We have, in our International Publication WO95/33096, described a method of increasing the levels of undissolved starch which can be incorporated into the thinstock. In that system we incorporate undissolved starch particles into part or all of the aqueous solution of retention aid. In systems in which shearing and degradation of flocs followed by addition of microparticulate material is used we also describe including insoluble starch particles in part or all of the aqueous suspension of microparticulate material. When the starch particles are included with the microparticulate material this is always done at the point at which the microparticulate material would be added in the absence of starch and no further components are suggested for inclusion in the slurry of starch and microparticulate material.

When the starch is incorporated into the stock as a component of the solution of retention aid or suspension of microparticulate material, it is present in substantially freely dispersed, i.e. unflocculated, form.

Although this system does give useful improvements in the levels of starch which can be incorporated into the paper without major increases in starch level in the effluent, we have found that there is still room for improvement, in that starch retention could be made more efficient. In particular, retention of potato starch and, especially, wheat starch and corn starch can be difficult in some systems.

It would be desirable to find a way of further increasing the levels of starch which can be incorporated into paper. It would be particularly desirable to be able to do this with maximum pick-up of starch so that minimum levels of starch are found in the white water passing through the screen. It would also be desirable to combine such a system with one in which good drainage and total retention are also obtainable.

According to the invention a process of making paper containing starch comprises providing a cellulosic thinstock suspension, flocculating the suspension by adding an aqueous solution of polymeric retention aid and thereby forming a flocculated suspension, optionally shearing the flocculated suspension and reflocculating the sheared suspension by adding aqueous anionic bridging coagulant and thereby forming a reflocculated suspension, draining the flocculated or reflocculated suspension through a moving screen to form a wet sheet, and carrying the sheet through a heated drying zone and thereby forming a dry sheet, wherein the process also comprises providing a coagulated slurry which contains undissolved starch particles and which is substantially free of filler by combining undissolved starch particles and a cationic polymeric flocculant and an anionic microparticulate network agglomeration aid in water to give network flocculation of the network agglomeration-aid in which the starch particles are trapped, and adding the coagulated slurry to the cellulosic suspension, and the undissolved starch particles are heated during the drying and release dissolved starch into the sheet in the presence of moisture.

In this process starch is added to the cellulosic thinstock as a component of a coagulated slurry. In this slurry, we believe that the cationic polymeric flocculant flocculates the microparticulate network agglomeration aid to give network flocculation. The undissolved starch particles present in the original slurry are thus trapped between the microparticles of network agglomeration aid in this network flocculation. We find that this coagulated (preflocculated) slurry can be added to the cellulosic suspension at various points and give unexpectedly good retention of starch in the sheet, even in processes where the flocculated suspension is subsequently sheared.

The system described by Fowler in the article discussed above did not describe achievement of such a coagulated slurry and in fact, as explained above, did not achieve such a coagulated slurry. Further, Fowler does not suggest the specific choice of a cationic polymeric flocculant to achieve the unique network flocculation we achieve in the invention. In particular, he does not suggest the use of the high intrinsic viscosity cationic polymeric flocculants which are preferred in the invention.

This invention can be applied to any retention system for the product of paper. However, we find that it is particularly advantageous when applied to systems in which the polymeric retention aid is cationic. Thus in the majority of this specification the invention will be discussed in the context of retention systems which require a cationic retention aid, although other types of retention aid may be used.

In the invention it is essential to add to the cellulosic thinstock suspension a coagulated slurry. In this specification, when we refer to a "coagulated" slurry we mean a slurry which has been agglomerated using the defined network flocculation system. The term "coagulated" does not limit the mechanism of action of the cationic polymeric flocculant, which may act by the mechanism commonly known as "flocculation" or the mechanism commonly known as "coagulation". To make the slurry, undissolved starch particles are provided. The starch should be such that it is substantially undissolved in that slurry. It should also be such that it remains substantially undissolved when added to the cellulosic suspension before that suspension is subjected to heating. Any particulate starch which meets these conditions may be used. Suitable starches include potato starch, wheat starch, corn starch, maize starch and tapioca starch. The process of the invention is particularly useful for improving retention of wheat starch and corn starch.

The starch may be included in the coagulated slurry in essentially raw, uncooked form. In some systems however it may be useful to provide the starch in the slurry in pre-swollen form. This can be done by treating the raw undissolved starch particles in water at a temperature of 45 to 55° C. before combining with the polymeric flocculant and network agglomeration aid. For instance, the raw starch particles can be held in water for at least 5 minutes, up to around 30 minutes at a temperature of 45 to 55° C., preferably 50 to 55° C. Alternatively the raw starch particles may be contacted with steam in a jet cooker for a very short length of time, for instance less than a second, so that the particles are heated to a temperature of from 45 to 55° C., preferably 50 to 55° C., and absorb water. We find that these methods cause the raw starch particles to swell but, provided the temperature is held below the cooking temperature of the starch used, normally around 60° C., the particles do not cook, burst and disperse through the water. Thus even when pre-swollen they remain in the form of discrete undissolved starch particles.

With the undissolved starch particles, either raw or in pre-swollen form, is combined a cationic polymeric flocculant. In this specification, by "flocculant" we mean any cationic polymeric material capable of giving the desired network flocculation, regardless of whether it would normally be considered to act as a flocculant. Materials which are considered to act as coagulants can be used and are included within the term "flocculant". The flocculant can be any material capable of giving the desired network flocculation with the network agglomeration aid, but is generally synthetic polymer. The cationic polymeric flocculant may be a synthetic polymer of fairly low intrinsic viscosity, for instance below 3 dl/g. However, it is often of intrinsic viscosity at least 4 dl/g. It is normally provided as an aqueous solution.

Preferred cationic polymeric flocculants have intrinsic viscosity at least 6 dl/g, for instance 8 to 15 dl/g or 8 to 20 dl/g or higher.

Suitable cationic polymers are copolymers of ethylenically unsaturated cationic monomer, with the balance being other water-soluble, generally non-ionic, ethylenically unsaturated monomer such as acrylamide. The amount of cationic monomer is usually at least 2 or 3 mol %. Generally it is not more than 20 mol % but it can be up to 50 mol % or more.

The cationic polymer can be amphoteric, due to the inclusion of a lesser amount of anionic monomer, such as acrylic acid or other ethylenically unsaturated carboxylic monomer.

The polymer can be wholly water-soluble or it can be in the form of polymers which are cross-linked. The polymers may be made with a small amount of cross-linking agent, eg as described in EP-A-202,780. Normally the polymer is linear.

The or each polymeric flocculant preferably has a theoretical cationic charge density of not more than about 4 meq/g, often not more than about 3 or 2 meq/g. Often it is at least about 0.1, or usually at least about 0.5 meq/g. In this specification, the theoretical cationic charge density is the charge density obtained by calculation from the monomeric composition which is intended to be used for forming the polymer.

Suitable cationic monomers include dialkylaminoalkyl (meth) acrylates and -acrylamides as acid addition or quaternary salts. The alkyl groups may each contain 1 to 4 carbon atoms and the amino alkyl group may contain 1 to 8 carbon atoms. Particularly preferred are dialkylaminoethyl (meth) acrylates or acrylamides and dialkylamino-1,3-propyl (meth) acrylamides.

In some systems the polymeric flocculant can be a copolymer of diallyl dimethyl ammonium chloride and acrylamide which has intrinsic viscosity at least 4 dl/g.

In especially convenient and efficient processes of the invention the material which is used as the cationic polymeric retention aid is the same material as that used as the cationic polymeric flocculant. This is advantageous in that it allows the benefits of the invention to be obtained using the materials already available for use in the paper making process.

Also combined with the undissolved starch particles is an anionic microparticulate network agglomeration aid. This material may be any anionic microparticulate material which is flocculated by the cationic polymeric flocculant. It is normally provided as an aqueous suspension. The flocculant and agglomeration aid together give network flocculation within which the undissolved starch particles are trapped. We believe this is the mechanism which occurs in the invention, rather than flocculation or agglomeration of the starch particles themselves by either of the materials added to the slurry.

Suitable network agglomeration aids include any of the anionic microparticulate materials known for use as anionic bridging coagulant in the process, for instance bentonite and the microparticulate polymers described in WO96/16223, for instance copolymers of 50 to 75 wt % ethyl acrylate and 25 to 50 wt % methacrylic acid. A preferred network agglomeration aid is bentonite.

When bentonite is used as the network agglomeration aid it is normally in the activated form which is generally used when bentonite is used in a retention system. That is, it is normally activated in conventional manner, so as to replace some of the calcium, magnesium or other polyvalent metal ions which are exposed, with sodium, potassium or other appropriate ions.

It is preferred, for improved convenience and efficiency, that the network agglomeration aid is the same material as the bridging coagulant (when used). This is beneficial, as again no new materials are required which are not already available for use in the paper making process.

The cationic polymeric flocculant and the network agglomeration aid may each be made up of more than one material provided separately or as a mixture. Preferably however each of these is provided as a single material.

The three materials which must be present in the coagulated slurry may be combined in any order. Each is preferably supplied in aqueous form (solution or slurry) but can be supplied dry, eg the starch can be used as dry particles, although it is preferably a slurry in water. Preferably the flocculant and agglomeration aid are each added to a slurry of starch in water, but it is also possible to add a starch slurry to a solution of the flocculant or a suspension of the microparticulate agglomeration aid. Preferably a slurry of undissolved starch particles in water is provided, to which an aqueous suspension of anionic microparticulate network agglomeration aid is added, before or after the cationic polymeric flocculant. We find that with certain systems better results are obtained with one particular order of addition. In particular, we find that where the network agglomeration aid is bentonite it can be preferred in some systems to add this to the starch slurry before addition of the cationic polymeric flocculant. In others however it is preferred to add the cationic polymeric flocculant to the starch slurry and subsequently to add the bentonite.

The amount of starch in the aqueous slurry is normally from 10 to 40%, often 15 to 30%, especially around 20 or 25%.

The cationic polymeric flocculant is normally added to the starch slurry in an amount of up to 1% by weight (active based on dry weight of starch), preferably up to 0.8%, often around 0.2 to 0.6%. Normally it is added in an amount of at least 0.05%, preferably at least 0.08%, more preferably at least 0.5%.

Generally the cationic polymeric flocculant is added in a total amount greater than that which would give flocculation of the starch particles if the flocculant alone were to be added to the starch slurry. It is often added in an amount such that if addition of the flocculant to the starch slurry alone is begun the slurry begins to flocculate, and as addition is continued the particles redisperse.

The anionic microparticulate network agglomeration aid is added to the starch slurry in amounts of up to 1.6% (dry weight based on dry weight of starch), preferably 0.1 to 0.8%, often around 0.4%.

It is important in the invention that the coagulated slurry is substantially free of filler, so that this does not interfere with the network flocculation of the network agglomeration aid by the cationic polymeric flocculant. If filler is desired to be incorporated into the final paper, this can be added at other points in the process in conventional manner. Small, non-interfering amounts of filler may be included in the slurry. For instance it is usually not more than the weight of starch in the slurry, and is preferably less than half the weight of starch. Preferably the slurry is totally free of filler.

Advantageously, the coagulated slurry is free also of other materials and consists essentially of starch, cationic polymeric flocculant and network agglomeration aid. in water.

The coagulated slurry is added to the thinstock. It is added separately from both the polymeric retention aid and the anionic bridging coagulant (if used), but can be added at the same time as either of these. It can be added before addition of the retention aid, but is preferably added after this.

In the preferred processes of the invention in which the flocculated suspension is sheared and reflocculated, the coagulated slurry can be added between the addition points of the retention aid and the bridging coagulant. We find that if it is added before the flocculated suspension is subjected to shear, then the formation is particularly good. Processes of this type are particularly suitable for the production of fine papers. We find also that if the coagulated slurry is added after shearing but before addition of the bridging coagulant, then starch retention is particularly good. This contributes to strength and thus such processes are especially suitable for the production of substantially unfilled papers such as packaging materials, for instance fluting medium and liner board.

The coagulated slurry is added to the thinstock in an amount sufficient to give the desired starch level. The amount of slurry which is added depends on the concentration of starch in the slurry, but is often up to 150 or even 250 liters per tonne dry weight of the suspension, preferably from 50 to 100 l/t, for instance around 75 l/t.

Amounts of starch in the stock are preferably at least 1 or 1.5% based on the dry weight of the suspension, preferably at least 3 or 5%, and can be as high as 7 or 10%. Levels of starch in the sheet will normally be at least 0.05%, often at least 0.2%. In the processes of the invention it is possible to achieve very high retention of the starch, and consequently it is possible to obtain a content of at least 2% or 3% and typically 6%, even up to 10, 12 or 15%, by weight starch in the dry sheet.

The starch particles are in undissolved form when they are added to the thinstock. The starch in these particles should remain substantially undissolved prior to the start of drainage of the suspension, since otherwise dissolved starch is likely to drain from the suspension. For instance preferably the amount of dissolved starch in the drainage water should represent less than 20%, preferably less than 10% and most preferably less than 5% of the amount of particulate starch in the suspension after discounting soluble starch originating elsewhere.

In most processes of the invention the starch is introduced in the coagulated slurry in substantially water-insoluble form and conditions in the suspension are maintained such that significant solubilisation does not occur prior to the start of drainage. In these processes, it is necessary to dissolve the starch during the draining and drying stages.

In conventional processes, draining is completed at temperatures above ambient, and drying is conducted with the application of heat. By appropriate choice of the draining and drying conditions and of the grade of undissolved starch, it is possible to achieve appropriate dissolution during the drying stage, while the sheet is still moist. It can be desirable to apply deliberate heating to the wet sheet, even before final drainage is completed, so as to pre-warm it before entry to the drying stages. For instance the wet sheet may be passed under a steam hood or heater such as a Devroniser (trade mark) and this can facilitate full dissolution of the starch.

The act of shearing the flocculated suspension prior to reflocculation will necessarily tend to break up any flocs or aggregates of starch particles, and so this preferred process would tend to result in the starch particles being more uniformly distributed as mono-particles through the sheet. As a result, more thorough dissolution of these particles will occur than when clusters of particles are present in the sheet, and this is an important advantage of the preferred processes of the invention which involve shearing and reflocculation of the flocculated suspension.

The starch particles need to gelatinise while there is still some moisture in the sheet in order to allow dissolution to proceed satisfactorily and in order to allow the starch to dissolve and spread so as to provide a film within the sheet. The starch will tend to migrate between the fibres so as to obtain more uniform distribution of the starch on and around and between the paper fibres. The amount of moisture that should remain in the sheet when the starch is dissolving can be quite low, and only needs to be sufficient to allow migration of the dissolved starch sufficient to give adequate distribution of the starch through the sheet.

To facilitate attainment of rapid gelatinisation and dissolution, it may be desirable to use a starch that naturally has a low temperature of gelatinisation or that has been modified to reduce its temperature of gelatinisation, provided it remains substantially undissolved prior to drainage. In particular it can be desirable to use pre-swollen starch particles as discussed above to reduce the time necessary for full dissolution of the starch particles in the sheet.

Pre-gelatinised or pre-cooked (and therefore soluble) starch can also be included as undissolved particles. Thus, the dissolution of pre-cooked starch in the particles of the slurry can be prevented by protecting the starch with a water impermeable shell or matrix that disintegrates during the subsequent draining or drying. Any material which provides sufficient water impermeability to prevent significant dissolution of the starch prior to drainage can be used provided the shell or matrix will disintegrate to release the starch during drainage and/or drying.

The shell or matrix does not have to provide long term water-impermeability. For instance a slow dissolving shell or matrix may be sufficient to protect the starch since even if the shell disintegrates partially within the head box there may still be inadequate time for the enclosed starch particle to dissolve in the head box.

The shell or matrix may be a thermoplastic material having a melting point such as to prevent premature disintegration of the shell or matrix. For instance the normal temperature of the suspension leading to the head box is typically in the range 40 to 50° C. and the ambient temperature around the drainage screen is typically in the same range. If the particles are provided with a coating or matrix which has a melting temperature at about or above the temperature of the head box, substantially no melting will occur until the head box and most of the melting and substantially all the dissolution of the starch will not occur until most of the draining has been completed. Suitable thermoplastic materials that can be used include hydrocarbon waxes.

Instead of using a thermoplastic shell or matrix, a pH sensitive shell or matrix may be used. For instance the cooked starch may be encapsulated or otherwise protected by polymer that is water-insoluble and non-swellable at the pH of the starch slurry, and this slurry is added to the head box which is at a pH at which the polymer shell swells or dissolves. For instance the protection polymer can be a copolymer of water-soluble and water-insoluble ethylenically unsaturated monomer such as methacrylic acid or other water-soluble monomer and ethylacrylate or other water-insoluble monomer. The manufacture of pH sensitive polymers of this general type by oil-in-water emulsion polymerisation is well known.

Methods of incorporating an active ingredient within particles of a protection matrix or within a shell are well known and can be used in the invention. For instance the mixture of the starch and protective material may be spray dried or a coacervate coating may be formed around the starch particles.

In the process of the invention the cellulosic thinstock suspension is usually flocculated by adding an aqueous solution of cationic polymeric retention aid. The retention aid can be soluble cationic starch. However it is generally preferred that the retention aid is a synthetic cationic polymer.

The polymer may have intrinsic viscosity of below 3 or 4 dl/g, but preferred retention aids are cationic synthetic polymers which have intrinsic viscosity of at least 4 dl/g and usually above 6 dl/g, for instance 8 to 15 dl/g or 8 to 20 dl/g or higher.

In this specification, intrinsic viscosity (IV) is measured at 25° C. in 1 M sodium chloride buffered at pH 7 using a suspended level viscometer.

Suitable cationic polymers are copolymers of ethylenically unsaturated cationic monomer, with the balance being other water-soluble, generally non-ionic, ethylenically unsaturated monomer such as acrylamide. The amount of cationic monomer is usually at least 2 or 3 mol %. Generally it is not more than 20 mol % but it can be up to 50 mol % or more. The polymer can be wholly water-soluble or it can be in the form of polymers as described in EP-A-202,780.

The or each high molecular weight cationic polymeric retention aid typically has a theoretical cationic charge density of not more than about 4 meq/g, often not more than about 3 or 2 meq/g. Generally it is at least about 0.1, or usually at least about 0.5 meq/g.

Suitable cationic monomers include dialkylaminoalkyl (meth) acrylates and -acrylamides as acid addition or quaternary salts. The alkyl groups may each contain 1 to 4 carbon atoms and the amino alkyl group may contain 1 to 8 carbon atoms. Particularly preferred are dialkylaminoethyl (meth) acrylates or acrylamides and dialkylamino-1,3, propyl (meth) acrylamides.

In some instances it can be desirable to use as the retention aid a copolymer of diallyl dimethyl ammonium chloride and acrylamide and which has intrinsic viscosity at least 4 dl/g.

The cationic polymeric retention aid may be made amphoteric by the inclusion of a lesser amount of anionic monomer, such as acrylic acid or, other ethylenically unsaturated carboxylic monomer.

In the process of the invention it is possible to use more than one type of retention aid. It is preferred however to use a single type of retention aid.

The total amount of polymeric retention aid is usually 0.01 to 1% generally 0.02 to 0.3% (200 to 3,000 g/tonne dry weight of suspension). When the process involves shearing and reflocculating with anionic bridging coagulant the amount of retention aid is generally in the range 0.01 to 0.2 or 0.3% but when the process is conducted merely with flocculation, followed by drainage, i.e., without the shearing and reflocculation, the amount is usually in the range 0.04 to 0.16%, often 0.06 to 0.15%.

The type and amount of retention aid used in the process are such that they give good retention of fibre fines (and filler if present). Selection of the retention aid and its amount can be conducted in conventional manner by performing the process in the absence of the coagulated slurry using different amounts of different retention aids so as to select an effective combination of retention aid and amount for the particular cellulosic suspension that is being treated. Naturally this test should be conducted with the subsequent addition of anionic bridging coagulant when the overall process involves the use of that material.

When the initial cellulosic suspension includes anionic trash, it can be desirable to treat the suspension initially with a cationic coagulant (such as a low molecular weight, high charge density polymer or an inorganic coagulant such as alum) and/or bentonite so as to reduce the amount of polymeric retention aid that is required.

The amount of retention aid will usually be greater than the amount required to precipitate or interact with anionic soluble material in the cellulosic suspension. If the retention performance is plotted against dosage of retention aid in a typical combination it will be seen that as the dosage increases retention will be poor and will increase only gradually at low values, but will then increase significantly over a relatively small dosage range, and will not then increase further to any significant extent. The dosage at which retention improves markedly is an indication of the demand of that suspension for that retention aid and in the invention the total amount of that retention aid should be at or above the amount at which retention has increased significantly. Accordingly this amount is above the stoichiometric amount required to react with any anionic polymeric material in the cellulosic suspension and any pulp from which it is formed. Generally the suspension is made without deliberate addition of anionic polymeric materials.

By saying that the cellulosic suspension is flocculated after addition of the cationic polymeric retention aid we mean that it has the state which is typical of a cellulosic suspension which has been treated with an effective high molecular weight retention aid in an effective amount.

In the invention it is also possible to use anionic polymeric retention aid and to use non-ionic polymeric retention aid.

Suitable non-ionic retention aids are described in our patent publications EP-A-608,986 and WO95/02088. Other suitable non-ionic retention aids are described in AU-A-63977/86. Suitable retention systems which can be used are described in EP-A-017,353 and U.S. Pat. No. 4,305,781, in which a substantially non-ionic polymer is added after addition of bentonite to the stock.

Suitable anionic retention aids are described in for instance EP-A-308,752. Systems in which the invention can be used include systems which have been commercialised under the trade name Positek.

Further retention systems to which the invention can be applied are described in the publications WO095/21296 and WO95/21295.

In the process of the invention the flocculated suspension can be drained directly and dried to form a dry sheet. In preferred processes of the invention the flocculated suspension is sheared. By shear we mean any treatment or force which is effective to degrade the flocs formed in the suspension. The shear may be provided by passing the flocculated suspension through a centriscreen or other high shear apparatus. Alternatively, in some processes simply subjecting the flocculated suspension to turbulent flow will provide sufficient shear to degrade the flocs to an adequate extent.

After shearing to degrade flocs the suspension is reflocculated by the addition of an anionic bridging coagulant. An anionic bridging coagulant is any material which is effective to reflocculate the degraded flocs to an extent which provides sufficient strength that the suspension can be drained through a moving screen to form a wet sheet. That is, it is an anionic retention aid and can be an anionic colloidal material.

Use of an anionic bridging coagulant is particularly preferred when the polymeric retention aid is cationic.

Materials which have been found to be particularly effective are anionic microparticulate materials. These may be inorganic, for instance colloidal silica (such as described in U.S. Pat. No. 4,643,801), polysilicate microgel (such as described in EP-A-359,552), polysilicic acid microgel (such as described in EP-A-348,366), aluminium modified versions of any of these or, preferably, bentonite. In particular systems can be used as described in U.S. Pat. Nos. 4,927,498, 4,954,220, 5,176,891 and 5,279,807 and commercialised under the trade name Particol by Allied Colloids and Dupont.

Anionic organic microparticulate materials can be used also. For instance, anionic organic polymeric emulsions are suitable. The emulsified polymer particles may be insoluble due to being formed of a copolymer of, for instance, a water-soluble anionic monomer and one or more insoluble monomers such as ethyl acrylate, but preferably the polymeric emulsion is a cross-linked microemulsion of water-soluble monomeric material, for instance as described in U.S. Pat. Nos. 5,167,766 and 5,274,055 and commercialised under the trade name Polyflex.

The particle size of the microparticulate material is generally below 2 $\mu$m, preferably below 1 $\mu$m and most preferably below 0.1 $\mu$m.

The preferred anionic microparticulate material for use as the anionic bridging coagulant is bentonite.

The amount of anionic bridging coagulant (dry weight based on the dry weight of the cellulosic suspension) is generally at least 0.03% and usually at least 0.1%. It can be up to for instance 1.6 or 2% but is generally below 1%. The choice and amount of the anionic bridging coagulant should be such as to cause what is frequently referred to as "supercoagulation".

The anionic bridging coagulant is preferably added to the suspension after the last point of high shear, for instance at the head box, and the suspension can then be drained in conventional manner.

In preferred processes of the invention the system is optimised for type and amount of polymeric retention aid and anionic bridging coagulant, if used, in the absence of the coagulated starch-containing slurry. The coagulated slurry is then included in the process in the desired amount without significant changes to the optimum levels and types previously found.

The cellulosic thinstock may be formed from any convenient pulp or mixture of pulps. It may have been formed in any conventional manner. For instance it may have been made from a groundwood, mechanical or thermomechanical pulp and the thinstock or the thickstock, from which it is formed, may have been treated with bentonite before the addition of the retention aid.

In the process of the invention, initial selection of suitable materials can be made on the basis of trials with conventional laboratory apparatus such as a Britt Jar and a hand sheet technique, but commercial operation of the process is conducted on a papermaking machine. In such processes the cellulosic thinstock is provided in conventional manner, generally by dilution of thickstock with white water, and is fed towards a head box through suitable apparatus such as a fan pump and centriscreen, and is discharged from the head box onto a moving screen.

The screen may travel at conventional screen speeds which are normally in excess of 100 meters per minute and typically are in the range 700 to 1,500 meters per minute.

The process of the invention may be used to make any desired type of paper, in which term we include paper board. Suitable papers may be filled and fine papers. Alternatively the paper may be substantially unfilled. In particular it may be a packaging material such as fluting medium or liner board.

The following are some examples of the invention.

EXAMPLES

Stock Preparation

Furnish composition:

60% newsprint

30% cardboard

10% magazine.

The above furnish was disintegrated at high consistency for 2,000 revolutions. The stock was then diluted to 1 and 3% consistency using tap water and left to condition overnight.

Starch Solution Preparation

The amount of deionised water required to make a 25% starch slurry was weighed into a glass beaker, stirred thoroughly and an addition of starch made. 25 g aliquots of the slurry were then weighed into plastic beakers. Raw potato starch was used throughout the experiment.

Optimisation of Coagulated Slurry Components

A beaker was thoroughly shaken to produce an aqueous starch suspension, followed by an addition of a noted amount of aqueous bentonite suspension (1% solids) as network agglomeration aid. The beaker was shaken several times and dosed with polymer flocculant (0.5% solids) and once again shaken. The remaining beakers were dosed with fixed amounts of bentonite and a range of polymer additions, to obtain the optimum polymer addition level. (The level which produced the biggest flocs). The optimum bentonite level was similarly found by varying the bentonite addition level and using the optimum dosage of polymer.

The degree of flocculation was assessed visually.

The procedure was performed using the following polymers:

Polymer A (Cationic): Copolymer of 20 wt % dimethyl aminoethyl acrylate quaternised with methyl chloride (DMAEAqMeCl) with 80 wt % acrylamide (ACM), IV around 9 to 11 dl/g.

Polymer B (Cationic): Copolymer of 20 wt % DMAEAqMeCl, and 80 wt % ACM IV around 9 to 11 dl/g.

Comparative Polymer D (Anionic): Copolymer 40 wt % sodium acrylate and 60 wt % ACM, IV above 10 dl/g.

Comparative Polymer E (Nonionic): ACM homopolymer containing less than 1% acrylate by weight.

Comparative Polymer F (Anionic): Copolymer of 40 wt % sodium acrylate and 60 wt % ACM, IV above 10 dl/g.

Results are shown in Table 1 below. Observations are coded as follows:

1. Massive defined flocs were formed and a clear supernatant
2. Big, well defined flocs were formed and a clear supernatant
3. Medium, defined flocs were formed and a clear supernatant
4. Small, well defined flocs were formed and a clear supernatant
5. Very small, well defined flocs were formed and a clear supernatant
6. Small flocs wer produced and a cloudy supernatant
7. Very small flocs were produced and a cloudy supernatant
8. The slurry was very slightly flocculated and a cloudy supernatant was produced.
9. No flocs.

TABLE 1

| Polymer Flocculant Used | Addition (g/t) | Bentonite Addition (g/t starch) | Observation |
|---|---|---|---|
| B | 400 | 4000 | 9 |
| B | 800 | 4000 | 5 |
| B | 1200 | 4000 | 4 |
| B | 1500 | 4000 | 3 |
| B | 1800 | 4000 | 2 |
| B | 2100 | 4000 | 1 |
| B | 2400 | 4000 | 1 |
| B | 2700 | 4000 | 2 |
| B | 2800 | 8000 | 1 |
| B | 8000 | 4000 | 3 |
| B | 8000 | 8000 | 3 |
| B | 4000 | 2000 | 3 |
| A | 400 | 4000 | 9 |
| A | 800 | 4000 | 8 |
| A | 1200 | 4000 | 4 |
| A | 4000 | 4000 | 2 |
| A | 4000 | 8000 | 3 |
| A | 4000 | 2000 | 3 |
| A | 8000 | 4000 | 3 |
| A | 2000 | 4000 | 3 |
| A | 8000 | 8000 | 3 |
| A | 4000 | 4000 | 1 |
| A | 3000 | 4000 | 1 |
| A | 2000 | 4000 | 1 |
| A | 1000 | 4000 | 4 |
| A | 1500 | 4000 | 4 |
| A | 2000 | 3000 | 1 (floccs not well formed) |
| A | 8000 | 4000 | 1 |

The above shows the flocculation effect produced in the slurry using a cationic retention aid and a network agglomeration aid according to the invention. The results in Table 2 below are given for Comparative Polymers D, E and F, which are not cationic and do not give such noticeable flocculation effects.

TABLE 2

| Polymer Flocculant Used | Addition (g/t starch) | Bentonite Addition (g/t starch) | Observation |
|---|---|---|---|
| F | 400 | 4000 | 9 |
| F | 800 | 4000 | 9 |
| F | 1200 | 4000 | 7 |
| F | 2000 | 4000 | 7 |
| F | 4000 | 4000 | 7 |
| F | 4000 | 8000 | 7 |
| F | 4000 | 2000 | 7 |
| F | 8000 | 8000 | 7 |
| D | 400 | 4000 | 9 |
| D | 800 | 4000 | 9 |
| D | 1200 | 4000 | 9 |
| D | 2000 | 4000 | 9 |
| D | 4000 | 4000 | 9 |
| D | 4000 | 8000 | 9 |
| D | 8000 | 8000 | 9 |
| D | 2000 | 2000 | 9 |
| E | 400 | 4000 | 8 |
| E | 800 | 4000 | 8 |
| E | 1200 | 4000 | 9 |
| E | 2000 | 4000 | 8 |
| E | 4000 | 4000 | 9 |
| E | 4000 | 8000 | 6 |
| E | 4000 | 2000 | 9 |

TABLE 2-continued

| Polymer Flocculant Used | Bentonite | | |
|---|---|---|---|
| | Addition (g/t starch) | Addition (g/t starch) | Observation |
| E | 8000 | 8000 | 6 |
| E | 8000 | 16000 | 6 |

Further tests were carried out to observe the effects of using low molecular weight anionic polymers of the type used by Fowler in the article in Paper mentioned above.

A beaker was thoroughly shaken to produce an aqueous starch suspension, followed by an addition of a noted amount of aqueous bentonite suspension (1% solids) as network agglomeration aid. The beaker was shaken several times and dosed with anionic polymer (0.5% solids) as polymer flocculant and once again shaken. The remaining beakers were dosed with a range of polymer and bentonite addition levels in an attempt to obtain starch flocculation.

The above procedure was performed using the following polymers, which are all homopolymers of acrylic acid (neutralised to sodium acrylate):

Comparative Polymer G: Molecular weight approximately 30,000, measured by gel permeation chromatography (GPC)

Comparative Polymer H: approximately 250,000, by GPC

Comparative Polymer J: approximately 2.5 million, by calculation from IV

Comparative Polymer K: approximately 5 million, by calculation from IV

Results are shown in Table 3 below.

TABLE 3

| Polymer | | | |
|---|---|---|---|
| Type | Addition (g/t starch) | Bentonite Addition (g/t starch) | Observation |
| Comparative Polymer H | 400 | 4000 | 9 |
| Comparative Polymer H | 800 | 4000 | 9 |
| Comparative Polymer H | 1200 | 4000 | 9 |
| Comparative Polymer H | 2500 | 4000 | 9 |
| Comparative Polymer H | 4000 | 4000 | 9 |
| Comparative Polymer H | 4000 | 8000 | 9 |
| Comparative Polymer H | 4000 | 1600 | 9 |
| Comparative Polymer H | 4000 | 3000 | 9 |
| Comparative Polymer H | 800 | 2000 | 9 |
| Comparative Polymer H | 800 | 1000 | 9 |
| Comparative Polymer J | 400 | 4000 | 9 |
| Comparative Polymer J | 800 | 4000 | 9 |
| Comparative Polymer J | 1200 | 4000 | 9 |
| Comparative Polymer J | 2500 | 4000 | 9 |
| Comparative Polymer J | 4000 | 4000 | 9 |
| Comparative Polymer J | 4000 | 8000 | 9 |
| Comparative Polymer J | 8000 | 8000 | 9 |
| Comparative Polymer J | 4000 | 3000 | 9 |
| Comparative Polymer J | 800 | 2000 | 9 |
| Comparative Polymer J | 200 | 4000 | 9 |
| Comparative Polymer G | 400 | 4000 | 9 |
| Comparative Polymer G | 800 | 4000 | 9 |
| Comparative Polymer G | 1200 | 4000 | 9 |
| Comparative Polymer G | 2500 | 4000 | g |
| Comparative Polymer G | 4000 | 4000 | 9 |
| Comparative Polymer G | 4000 | 8000 | 9 |
| Comparative Polymer G | 4000 | 160000 | 9 |
| Comparative Polymer G | 8000 | 32000 | 9 |
| Comparative Polymer G | 2500 | 2000 | 9 |
| Comparative Polymer K | 400 | 4000 | 9 |
| Comparative Polymer K | 800 | 4000 | 9 |
| Comparative Polymer K | 1200 | 4000 | 9 |
| Comparative Polymer K | 2500 | 4000 | 9 |
| Comparative Polymer K | 4000 | 4000 | 9 |
| Comparative Polymer K | 4000 | 800 | 9 |
| Comparative Polymer K | 4000 | 16000 | 9 |
| Comparative Polymer K | 4000 | 3200 | 9 |
| Comparative Polymer K | 800 | 2000 | 9 |
| Comparative Polymer K | 800 | 1000 | 9 |

The above results show that none of the low molecular weight anionic polymers give any flocculation effect in the starch slurry in the presence of bentonite.

Use in Retention/Drainage System

Two systems were optimised. System 1 required addition of Polymer A as cationic polymeric retention aid and bentonite as anionic bridging coagulant. System 2 used only addition of cationic polymeric retention aid (Polymer C, a cationic copolymer of 20 wt % DMAEAqMeCl and 80 wt % ACM, IV 6 to 7 dl/g), without shearing and reflocculation of the flocculated suspension. This was used to test the anionic polymers (G, H, J and K), since a system of this type was used by Fowler in the experiments relating to his article in Paper, above.

Tests were then carried out on the system, with and without coagulated slurry, as described below. In System 1, the High Shear system involved adding coagulated slurry when the stock was being subjected to high shear, and the Low Shear system involved adding coagulated slurry when the stock was being subjected to low shear.

Retention

Blank (1)
i. The Heidolph was set at 1500 rpm and switched on.
ii. 500 ml of 1% stock was poured into the Baffled Britt Jar and the stop watch started simultaneously.
iii. After a period of 35 seconds' stirring, the rpm was reduced to 800.
iv. 5 seconds later the Britt Jar tap was opened.
v. The backwater drained in the initial 5 seconds was discarded and the following 30 seconds of backwater was collected in a beaker.

Control (1)
i. The Heidolph was set at 1500 rpm and switched on.
ii. 500 mls of 1% stock was poured into the Baffled Britt Jar and the stop watch started simultaneously.
iii. The stock was stirred for 5 seconds, after which an addition of starch slurry was made. (Enough to give a level in the stock of 5% starch on dry fibre).
iv. After a period of 30 seconds stirring the rpm was reduced to 800 rpm.
v. 5 seconds later the Britt Jar tap was opened.
vi. The backwater drained in the initial 5 seconds was discarded and the following 30 seconds of backwater was collected in a beaker.

Retention in System 1 (High Shear)
i. A coagulated slurry containing 25% starch was prepared as above using the optimum addition levels of bentonite (network agglomeration aid) and Polymer A (cationic polymer flocculant) found above, which were 4000 g/t starch and 3000 g/t starch respectively.
ii. The Heidolph was set at 1500 rpm and switched on.
iii. 500 mls of 1% stock was poured into the Baffled Britt Jar and the stop watch started simultaneously.
iv. The stock was stirred for 5 seconds, after which an addition of Polymer A was made.
v. 15 seconds later an addition of the coagulated slurry was made (5% starch on dry fibre).
vi. After a period of 15 seconds' stirring the rpm was reduced to 800 and an addition of bentonite was made simultaneously.
vii. 5 seconds later the Britt Jar tap was opened.
viii. The backwater drained in the initial 5 seconds was discarded and the following 30 seconds of backwater collected.
ix. The above procedure was repeated using a range of retention aid addition levels.

Retention in System 1 (Low Shear)
i. A coagulated slurry containing 25% starch was prepared as above using the optimum addition levels of bentonite and Polymer A found above, which were 4000 g/t starch and 3000 g/t starch respectively.
ii. The Heidolph was set at 1500 rpm and switched on.
iii. 500 mls of 1% stock was poured into the Baffled Britt Jar and the stop watch started simultaneously.
iv. The stock was stirred for 5 seconds, after which an addition of Polymer A was made.
v. After a period of 30 seconds of stirring the rpm was reduced to 800 and an addition of the coagulated slurry was made simultaneously (to give a level in the stock of 5% starch on dry fibre).
vi. 15 seconds later the stock was dosed with bentonite.
vii. After 5 seconds' stirring the Britt Jar tap was opened.
viii. The backwater drained in the initial 5 seconds was discarded and the following 30 seconds of backwater was collected.

System 2
i. Coagulated slurries containing 25% starch were prepared containing a range of bentonite and low molecular weight anionic polymer addition levels. A range of addition levels were used because optimum dosages could not be found (the slurry would not flocculate).
ii. 166.7 grams of thickstock (3% consistency) was placed into a Britt Jar set at 1500 rpm.
iii. The required addition of the coagulated slurry was made (5% starch on dry fibre) and the stock was stirred for 30 seconds.
iv. The treated stock was then transferred to a measuring cylinder, dosed with Polymer C and mixed by inverting the measuring cylinder four times.
v. The Heidolph was set at 800 rpm and switched on.
vi. The flocculated stock was then poured into the Baffled Britt Jar and a stop watch started simultaneously.
vii. After 5 seconds' stirring the Britt Jar tap was opened.
vii. The backwater drained in the initial 5 seconds was discarded and the following 30 seconds of backwater was collected in a beaker.

Control (2)
i. 166.7 grams of thickstock (3% consistency) was placed into a Britt Jar set at 1500 rpm.
ii. An addition of a 25% starch slurry was made and the stock was stirred for 30 seconds.
iii. The stirrer speed was reduced to 800 rpm.
iv. Five seconds later the Britt Jar tap was opened.
v. The backwater drained in the initial 5 seconds was discarded and the following 30 seconds of backwater was collected in a beaker.

Blank (2)
This was carried out as for control (2) with one alteration, in that no starch addition was made.

Results for total retention (given as fibre retention) and starch level in the backwater are given in the tables below.

TABLE 4

| | Coagulated Slurry | | | System 1 Retention | | | |
|---|---|---|---|---|---|---|---|
| System Details | Starch addition (% on dry fibre) | Flocculant Polymer A addition (g/t) on dry starch | Bentonite addition (g/t) on dry starch | Aid Polymer A addition (g/t) on dry fibre | Bentonite addition (g/t) on dry fibre | Average Fibre Retention % | Average starch level (ppm in backwater) |
| Blank (1) | — | — | — | — | — | 79 | 2.42 |
| Control (1) | 5 | — | — | — | — | 72 | 465.87 |
| System 1 | — | — | — | 800 | 4000 | 80 | 0.15 |
| System 1 | — | — | — | 1400 | 4000 | 88 | — |

TABLE 4-continued

| System | Starch addition (% on dry fibre) | Polymer Type | Polymer Addition g/t on dry starch | Retention Aid Bentonite Addition (g/t on dry fibre) | Polymer C (g/t on dry starch) | Average fibre retention (%) | Average starch level (ppm in backwater) |
|---|---|---|---|---|---|---|---|
| System 1 | — | — | — | 1600 | 4000 | 92 | — |
| System 1 | — | — | — | 1800 | 4000 | 93 | — |
| System 1 | — | — | — | 2000 | 4000 | 95 | — |
| System 1 High Shear | 5 | 3000 | 4000 | 1200 | 4000 | 83 | 244.33 |
| System 1 High Shear | 5 | 3000 | 4000 | 1400 | 4000 | 85 | 171.63 |
| System 1 High Shear | 5 | 3000 | 4000 | 1800 | 4000 | 92 | 184.71 |
| System 1 High Shear | 5 | 3000 | 4000 | 2000 | 4000 | 94 | 166.70 |
| System 1 High Shear | 5 | 3000 | 4000 | 1600 | 4000 | 92 | |
| System 1 High Shear | 5 | 3000 | 4000 | 1800 | 4000 | 91 | 213.24 |
| System 1 High Shear | 5 | 3000 | 4000 | 2000 | 4000 | 94 | 164.98 |
| Blank (2) | — | — | — | — | — | 70 | 0 |
| Control (2) | 5 | — | — | — | — | 65 | 502.75 |
| System 2 | — | — | — | — | 700 | 84 | 0 |
| System 2 | — | — | — | — | 900 | 86 | 0 |
| System 2 | — | — | — | — | 1100 | 87 | 0 |
| System 2 | — | — | — | — | 1300 | 89 | 0 |
| System 2 | — | — | — | — | 1500 | 92 | 0 |
| System 2 | 5 | G | 3000 | 4000 | 1500 | 87 | 541.79 |
| System 2 | 5 | G | 10000 | 2000 | 1500 | 87 | 577.82 |
| System 2 | 5 | G | 30000 | 4000 | 1500 | 88 | 611.92 |
| System 2 | 5 | G | 1000 | 2000 | 1500 | 90 | 492.03 |
| System 2 | 5 | K | 3000 | 4000 | 1500 | 86 | 450.96 |
| System 2 | 5 | K | 10000 | 20000 | 1500 | 86 | 533.21 |
| System 2 | 5 | K | 30000 | 40000 | 1500 | 88 | 615.35 |
| System 2 | 5 | K | 1000 | 2000 | 1500 | 87 | 377.73 |

The above results show the significant improvement in backwater starch levels using System 1 with a coagulated slurry according to the invention, in comparison with use of a non-coagulated slurry, despite the fact that broadly similar total retention results are obtained.

What is claimed is:

1. A process of making paper containing starch, comprising providing a cellulosic thin stock suspension, flocculating the suspension by adding an aqueous solution of polymeric retention aid and thereby forming a flocculated suspension, optionally shearing the flocculated suspension and reflocculating the sheared suspension by adding aqueous anionic bridging coagulant and thereby forming a reflocculated suspension, draining the flocculated or reflocculated suspension through a moving screen to form a wet sheet, and carrying the sheet through a heated drying zone and thereby forming a dry sheet, wherein the process also comprises
providing a coagulated slurry which contains undissolved starch particles and which is substantially free of filler by combining undissolved starch particles and cationic polymeric flocculant and an anionic microparticulate network agglomeration aid to give network flocculation of the network agglomeration aid in which the starch particles are trapped, and adding the coagulated slurry to the cellulosic suspension, and the undissolved starch particles are heated during the drying and release dissolved starch into the sheet in the presence of moisture, wherein the dry sheet retains at least 2% by weight of starch.

2. A process according to claim 1 in which the polymeric retention aid is a cationic polymeric retention aid selected from dissolved cationic starch and cationic synthetic polymers having intrinsic viscosity at least 4 dl/g.

3. A process according to claim 1 which comprises shearing the flocculated suspension and reflocculating the sheared suspension by adding anionic bridging coagulant and thereby forming a reflocculated suspension which is drained through a moving screen to form the wet sheet.

4. A process according to claim 3 in which the anionic bridging coagulant is a suspension of microparticulate anionic material selected from bentonite, colloidal silica, polysilicate microgel, polysilicic acid microgel and crosslinked microemulsions of water soluble monomeric material.

5. A process according to claim 1 in which the polymeric retention aid is a synthetic cationic polymer having intrinsic viscosity of at least 4 dl/g.

6. A process according to claim 1 in which the anionic microparticulate network agglomeration aid is bentonite.

7. A process according to claim 1 in which the polymeric flocculant is a synthetic cationic polymer having intrinsic viscosity at least 4 dl/g.

8. A process according to claim 3 in which the polymeric flocculant is the same material as the polymeric retention aid and the anionic network agglomeration aid is the same material as the anionic bridging coagulant.

9. A process according to claim 1 in which the coagulated slurry is added to the cellulosic thin stock suspension after addition of the aqueous solution of polymeric retention aid.

10. A process according to claim 3 in which the coagulated slurry is added to the flocculated suspension before shearing.

11. A process according to claim 3 in which the coagulated slurry is added to the suspension after shearing and before addition of anionic bridging coagulant.

12. A process according to claim 1 in which the polymeric flocculant has charge density of not more than 3 meq/g and intrinsic viscosity at least 4 dl/g.

13. A process according to claim 1 in which the starch particles are pre-swollen before addition of polymeric flocculant and network agglomeration aid, by heating raw starch particles to a temperature of 45 to 55° C. in the presence of water.

14. A process according to claim 1 in which the amount of polymeric flocculant in the coagulated slurry is up to 10 kg/t dry solids based on dry starch solids and the amount of network agglomeration aid is up to 16 kg/t dry solids based on dry starch solids.

15. A process according to claim 1 in which the coagulated slurry is formed by adding to a slurry of starch particles an aqueous suspension of the network agglomeration aid and an aqueous solution of the polymeric flocculant.

16. A process according to claim 1 in which the paper is substantially unfilled.

17. A process according to claim 3 in which the anionic bridging coagulant is bentonite.

18. A process according to claim 16 in which the paper is a packaging material.

* * * * *